US012111886B2

(12) United States Patent
Kah et al.

(10) Patent No.: US 12,111,886 B2
(45) Date of Patent: Oct. 8, 2024

(54) DATA COLLECTION AND RETRAINING IN EDGE VIDEO DEVICES

(71) Applicant: Western Digital Technologies, Inc., San Jose, CA (US)

(72) Inventors: Damien Kah, San Jose, CA (US); Qian Zhong, Freemont, CA (US); Shaomin Xiong, Freemont, CA (US); Toshiki Hirano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 214 days.

(21) Appl. No.: 17/515,977

(22) Filed: Nov. 1, 2021

(65) Prior Publication Data
US 2023/0138798 A1    May 4, 2023

(51) Int. Cl.
*G06F 18/214*   (2023.01)
*G06F 18/21*    (2023.01)
*G06V 20/40*    (2022.01)
*G06V 20/52*    (2022.01)

(52) U.S. Cl.
CPC .......... *G06F 18/214* (2023.01); *G06F 18/217* (2023.01); *G06V 20/40* (2022.01); *G06V 20/52* (2022.01)

(58) Field of Classification Search
None
See application file for complete search history.

(56) References Cited

U.S. PATENT DOCUMENTS

| 8,385,632 | B2 | 2/2013 | Porikli | |
|---|---|---|---|---|
| 2018/0107182 | A1* | 4/2018 | Mohamadi | G06V 10/82 |
| 2019/0065908 | A1* | 2/2019 | Lee | G06F 18/2155 |

(Continued)

FOREIGN PATENT DOCUMENTS

| CN | 10701635 | 8/2017 |
|---|---|---|
| WO | 2015192239 A1 | 12/2015 |
| WO | 2021061341 A1 | 4/2021 |

OTHER PUBLICATIONS

Sun, P., "Deep Learning Technology Applications for Video Surveillance", Security News, screen capture Jul. 6, 2021, https://www.securityinformed.com/insights/deep-learning-technology-applications-video-surveillance-co-14319-ga.21460.html.

(Continued)

*Primary Examiner* — Vikkram Bali

(74) *Attorney, Agent, or Firm* — Ravi Mohan; Rutan & Tucker, LLP

(57) ABSTRACT

A digital video camera architecture for updating an object identification and tracking model deployed with the camera is disclosed. The invention comprises optics, a processor, a memory, and an artificial intelligence logic which may further comprise artificial neural networks. The architecture may identify objects according to a confidence threshold of a model. The confidence threshold may be monitored over time, and the model may be updated if the confidence threshold drops below an acceptable level. The data for retraining is ideally generated substantially internal to the camera. A filter is generated to process the entire field data set stored on the camera to create a field data subset also stored on the camera. The field data subset may be run through the model to generate cases that may be used in further monitoring, training, and updating of the model.

11 Claims, 9 Drawing Sheets

(56) References Cited

U.S. PATENT DOCUMENTS

| | | | |
|---|---|---|---|
| 2020/0050899 A1* | 2/2020 | Debnath | G06F 18/2411 |
| 2020/0226430 A1* | 7/2020 | Ahuja | G06V 10/774 |
| 2021/0081724 A1* | 3/2021 | Ma | G06N 5/04 |
| 2021/0142068 A1 | 5/2021 | Aliamiri et al. | |
| 2023/0162488 A1* | 5/2023 | Boulanger | G06V 10/82 |
| | | | 382/157 |

OTHER PUBLICATIONS

Tang, B., "Data Collection and Feature Extraction for Machine Learning", screencapture Jul. 5, 2021, https://medium.com/ai%B3-theory-practice-business/data-collection-and-feature-extraction-for-machine-learning-98f976401378.

"Training Data Sets for Security Industry using AI Camera for Object Detection", screencapture Jul. 6, 2021, https://medium.com/al%B3-theory-practice-business/data-collection-and-feature-extraction-for-machine-learning-981976401378.

"Machine Learning Model Validation Services", screen capture Jul. 6, 2021, https://medium.com/al%B3-theory-practice-business/data-collection-and-feature-extraction-for-machine-learning-981976401378.

\* cited by examiner

DATA COLLECTION AND RETRAINING IN EDGE VIDEO DEVICES

FIELD

The present disclosure relates to image processing. More particularly, the present disclosure technically relates to efficient training and retraining of artificial neural networks in video data processing in edge video devices.

RELATED APPLICATIONS

This application is related to application Ser. No. 17/516,188, filed on the same day, owned by the same assignee, and is included herein by reference in its entirety.

BACKGROUND

As technology has grown over the last decade, the quantity of time-series data such as video content has increased dramatically. This increase in time-series data has generated a greater demand for automatic object identification and classification. In response, neural networks and other artificial intelligence methods have been increasingly utilized to generate automatic classifications, specific detections, and segmentations. In the case of video processing, computer vision trends have progressively focused on object detection, image classification, and other segmentation tasks to parse semantic meaning from video content. In particular, there is a need to improve the models used for object detection. It is desirable for this process to be automated as much as possible.

BRIEF DESCRIPTION OF DRAWINGS

The above and other aspects, features, and advantages of several embodiments of the present disclosure will be more apparent from the following description as presented in conjunction with the following several figures of the drawings.

Figure 1:
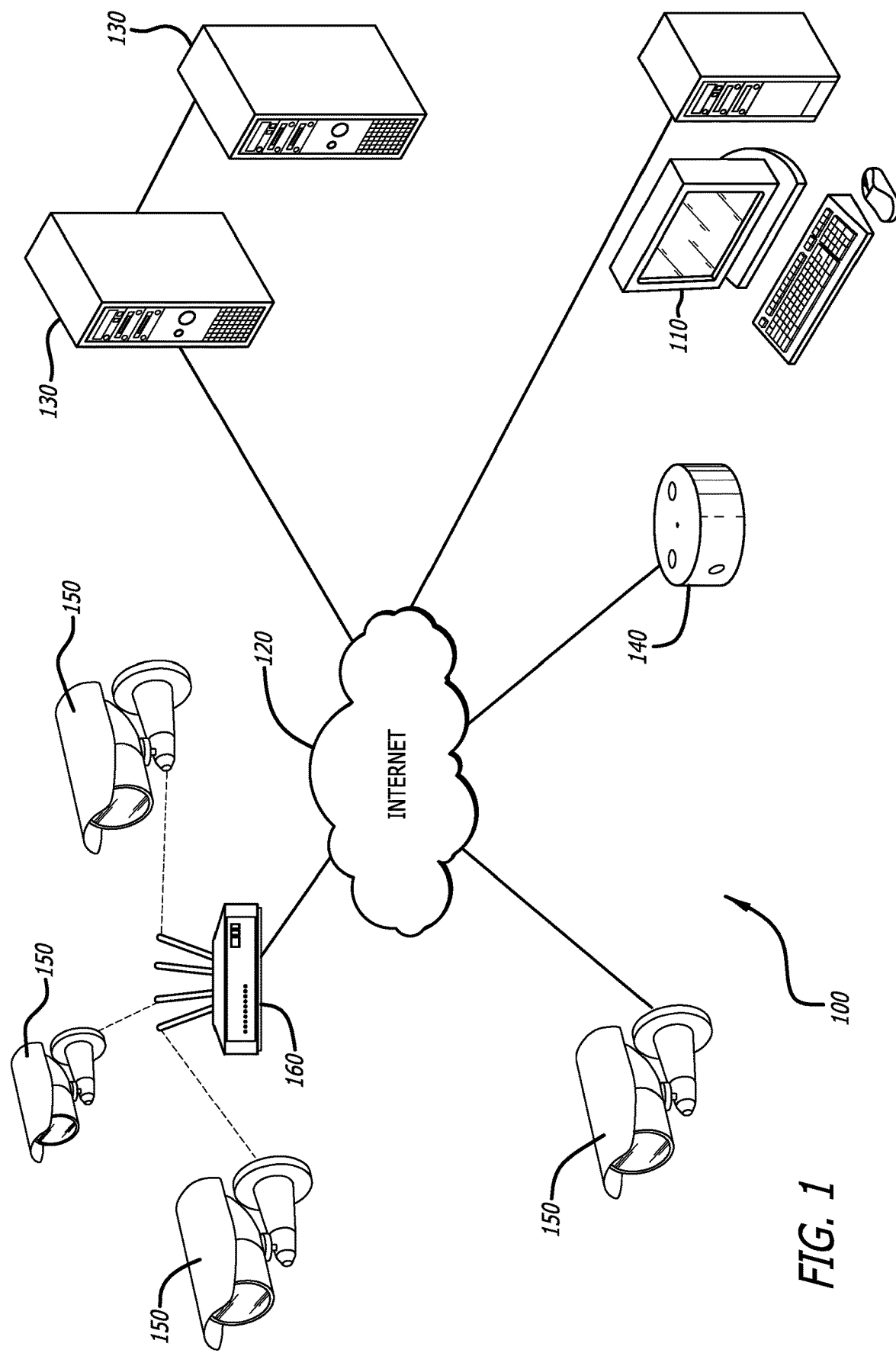
FIG. 1 is a conceptual illustration of a video image data processing system in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

In response to the issues described above, systems and methods are discussed herein that describe processes for streamlining the process of updating the models of video image data processing within artificial neural networks and other Artificial Intelligence (AI) techniques. Specifically, systems and methods are presented for the improvement of the models employed by digital video cameras with a minimum of human intervention.

In particular, it may be desirable to increase the certainty with which models detect objects and track their motions. A confidence threshold may be used in the models to differentiate between True Positive (TP) detections (e.g., correct detection of an object), False Positive (FP) detections (e.g., incorrect detections of an object), True Negative (TN) detections (e.g., correct detections of the absence of an object), and False Negative (FN) detections (e.g., incorrect detection of an object that is not present or miss an object that is present). Collecting examples of FP and FN cases may be used to periodically train and update the model In practical applications, digital video cameras may be installed in clusters for purposes of surveillance of an area or areas. A single customer may have multiple installations, and additional customers may increase the installed base even further. The digital video cameras may be coupled to one or more computers which may be (optionally) operated by either the camera owner(s), the camera manufacturer and/or a service provider. The amount of stored data may be immense with hundreds of hours of video stored in thousands of cameras in dozens or hundreds of installations worldwide.

In all of that data, there may be mistakes where the model made a FP or FN identification. Further, the accuracy of a model may decay over time due to changes in different factors, such as, time of day, weekday, weather, occlusions in the video field of a camera, etc. This may cause some frames seen by the camera while deployed to have images that do not resemble any image from the training data set. These unseen images and their situation (or context) may be responsible for the accuracy decay. It may be desirable to identify some of these cases to improve the training data used to create the models. Given the volume of data, automation may be necessary to find those errant cases, select some for either human annotation (e.g., a human or user making a judgment if the FP or FN candidate is really incorrect) or computer annotation (e.g., a cloud or server-based AI processing making that judgment). Some of the data collection and retraining may be performed internal to the digital video camera. This may eliminate the need for shipping large quantities of video data to computers or servers for processing, saving both computational and bandwidth resources.

Embodiments of the present disclosure can be utilized in a variety of fields, including general video analytics, facial recognition, object segmentation, object recognition, autonomous driving, traffic flow detection, drone navigation/operation, stock counting, inventory control, and other automation-based tasks that generate time-series based data. The use of these embodiments can result in fewer required computational resources to produce similarly accurate results compared to a traditional convolutional or other neural network. In this way, more deployment options may become available as computational resources increase and become more readily available on smaller and less expensive electronic devices.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, field-programmable gate arrays ("FPGAs") or other discrete components. A function may also be implemented in programmable hardware devices such as programmable array logic, programmable logic devices, or the like.

"Neural network" refers to any logic, circuitry, component, chip, die, package, module, system, sub-system, or computing system configured to perform tasks by imitating biological neural networks of people or animals. Neural network, as used herein, may also be referred to as an artificial or deep neural network (DNN). Examples of neural networks that may be used with various embodiments of the disclosed solution include, but are not limited to, convolutional neural networks, feed forward neural networks, radial basis neural network, recurrent neural networks, modular neural networks, and the like. Certain neural networks may be designed for specific tasks such as object detection and/or image classification. Examples of neural networks suitable for object detection include, but are not limited to, Region-based Convolutional Neural Network (RCNN), Faster Region-based Convolutional Neural Network (Faster R-CNN), You Only Look Once (YOLO), and the like. Examples of neural networks suitable for image classification may include, but are not limited to, Googlenet Inception, Resnet, Mobilenet, Densenet and Efficientnet. A neural network may include both the logic, software, firmware, and/or circuitry for implementing the neural network as well as the data and metadata for operating the neural network. One or more of these components for a neural network may be embodied in one or more of a variety of repositories, including in one or more files, databases, folders, or the like. The neural network used with embodiments disclosed herein may employ one or more of a variety of learning models including, but not limited to, supervised learning, unsupervised learning, and reinforcement learning. These learning models may employ various backpropagation techniques.

Functions or other computer-based instructions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions, logics and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In some embodiments, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions, logics, and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, loading, storing, buffering, and/or transferring data can include the entirety of the data, a portion of the data, a set of the data, and/or a subset of the data. Likewise, reference to reading, writing, loading, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a video image data processing computational system 100 in accordance with an embodiment of the disclosure is shown. In many embodiments, it may be desired to monitor one or more visual areas by installing security cameras 150 within those areas. The security cameras 150 can generate a plurality of video image data (i.e., "video content") that can be processed. In a number of embodiments, the processing of the video image data will be configured to determine if one or more specific objects are within the monitored visual areas. In a number of embodiments, this detection may be presented as an inference map image from an object detection neural network which can be a segmentation or panoptic map. These maps can be utilized as a classification as to whether a specific object is present within the input data or not. These maps can be generated as an output from a neural network such as, but not limited to, a convolutional neural network (CNN). By way of example, and not limitation, video image data processing can be established to detect the presence of one or more pedestrians within the monitored visual areas. It will be understood by those skilled in the art that the video image data processing may be performed by processors internal to security cameras 150 or elsewhere in the computational system or in some combination thereof. The video image data processing may be implemented in software operating in conventional processors (e.g., CPU, MPU, GPU, RISC, etc.), and/or software operating in specifically purposed processors optimized to implement neural networks—or some combination thereof. In fact, the entire system may be considered a processor or a distributed processor.

Monitoring video content can be inefficient when done manually. Therefore, various embodiments attempt to minimize the amount of video content that needs to be manually reviewed by attempting to identify and/or determine if one or more specific objects are within the video content and then trigger a notification for manual review. Often, the video image data processing system 100 will process the video image data within a centralized video processing server 110, although some embodiments may offload various processing tasks to other devices such as, but not limited to, edge network devices 140 (like, for example, server farms, specialized AI hardware accelerators, online databases, etc.), servers 130, or internal to the security cameras 150 (themselves edge network devices). The video processing server 110 is often connected to a network 120 such as the Internet as depicted in FIG. 1. A plurality of security cameras 150 can also be attached to the network 120 such that they are communicatively coupled to the video processing server 110 comprising one or more processors like, for example, CPUs, MPUs, GPUs, etc. Although the embodiment of FIG. 1 depicts security cameras 150, it will be understood by those skilled in the art that any video image data capture device may be utilized as required by the desired application.

The security cameras 150 can be wired directly to the network 120 or may be wirelessly connected via one or more wireless access points 160. In this way, a variety of potential deployment arrangements may be realized to properly cover the desired areas for surveillance. In theory, there is no limit to the number of deployed security cameras 150 or other video image data capture devices that may be communicatively coupled with the video processing server 110. The limitations experienced may relate to the available bandwidth of the network 120 and computational resources of the video processing server 110. As discussed below, superior performance for computational system 100 is for the bulk of the processing to be done locally by digital video cameras, such as security cameras 150 or other edge network devices 140 to minimize network traffic and reduce the need for centralized computing resources like video processing server 110 and servers 130.

Figure 2:
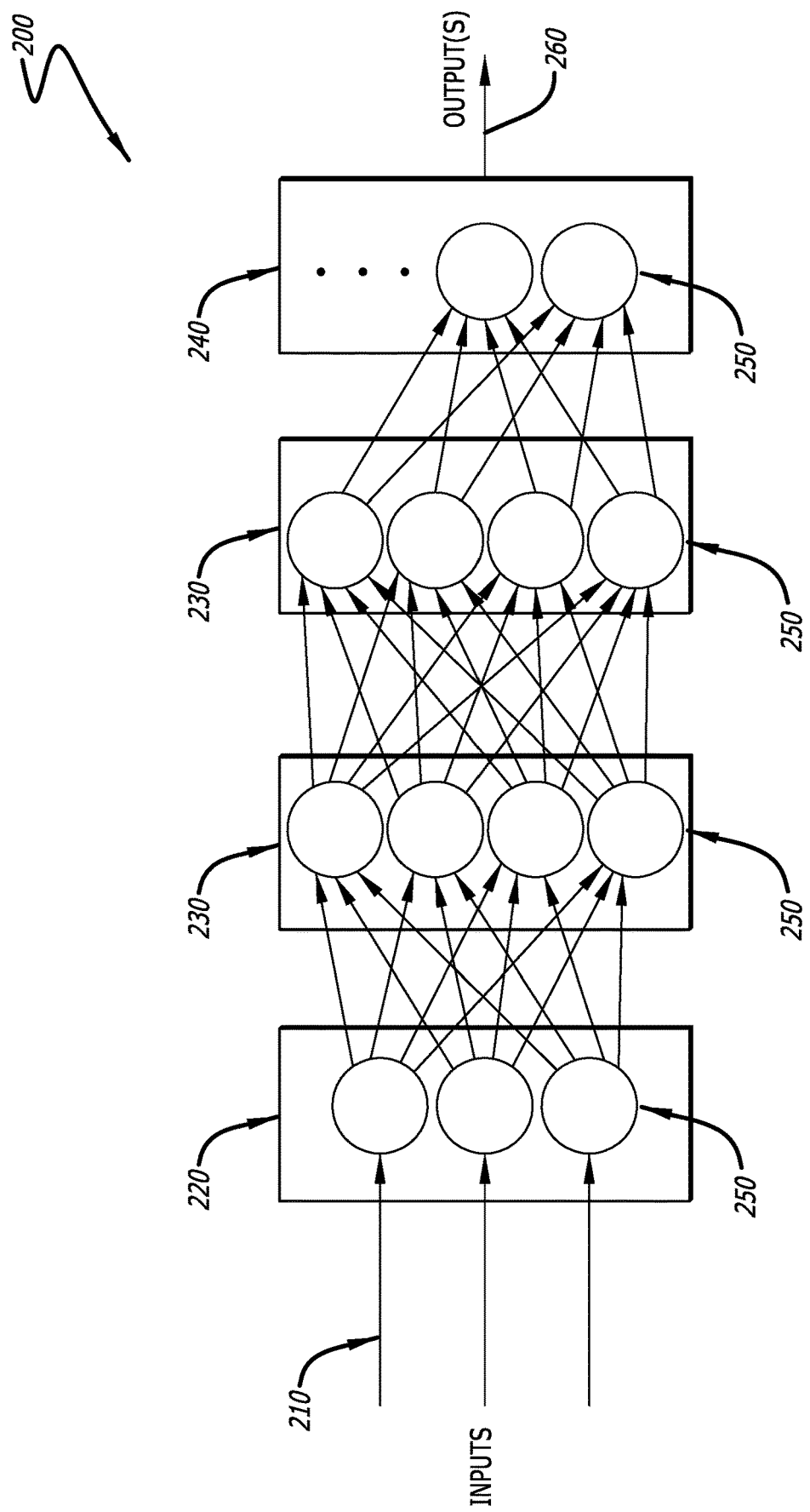
FIG. 2 is a conceptual illustration of an artificial neural network in accordance with an embodiment of the disclosure.

Referring to FIG. 2, a conceptual illustration of an artificial neural network 200 in accordance with an embodiment of the disclosure is shown. At a high level, the artificial neural network 200 comprises a number of inputs 210, an input layer 220, one or more intermediate layers 230, and an output layer 240. The artificial neural network 200 comprises a collection of connected units or nodes called artificial neurons 250 which loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. As those skilled in the art will recognize, the artificial neural network 200 depicted in FIG. 2 is shown as an illustrative example and various embodiments may comprise artificial neural networks that can accept more than one type of input and can provide more than one type of output.

In a typical embodiment, the signal at a connection between artificial neurons is a real number, and the output of each artificial neuron is computed by some non-linear function (called an activation function) of the sum of the artificial neuron's inputs. The connections between artificial neurons are called "edges" or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 220) to the last layer (the output layer 240), possibly after traversing one or more intermediate layers (also called hidden layers) 230.

The inputs to an artificial neural network may vary depending on the problem being addressed. In object detection, the inputs may be data representing pixel values for certain pixels within an image or frame. In one embodiment the artificial neural network 200 comprises a series of hidden layers in which each neuron is fully connected to neurons of the next layer. The artificial neural network 200 may utilize an activation function such as sigmoid, nonlinear, or a rectified linear unit (ReLU), upon the sum of the weighted inputs, for example. The last layer in the artificial neural network may implement a regression function such as SoftMax regression to produce the classified or predicted classifications output for object detection as output 260. In further embodiments, a sigmoid function can be used, and position prediction may need raw output transformation into linear and/or non-linear coordinates.

In certain embodiments, the artificial neural network 200 is trained prior to deployment and to conserve operational resources. However, some embodiments may utilize ongoing training of the artificial neural network 200 especially when operational resource constraints such as die area and performance are less critical.

Figure 3:
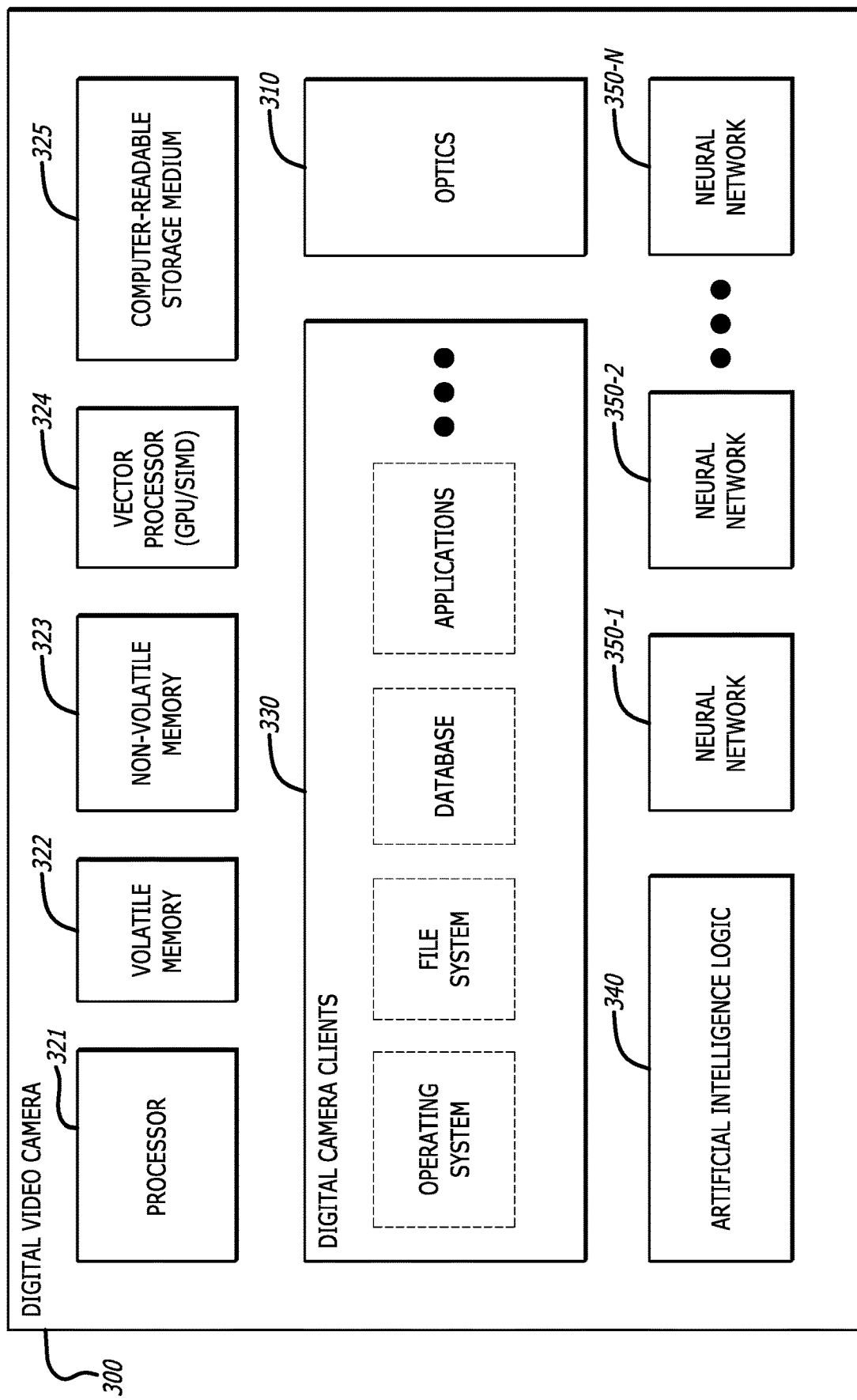
FIG. 3 is a schematic block diagram of a digital video camera in accordance with an embodiment of the disclosure.

Referring to FIG. 3, a schematic block diagram of a digital video camera in accordance with an embodiment of the disclosure is shown. Digital video camera 300 may comprise optics module 310 which may further comprise the lenses (not shown), the charge coupled devices (CCD) used to capture images (not shown), and the support circuitry (not shown) necessary for capturing successive frames of video data. Processor 321 may execute various control programs and applications such as digital camera clients 330. Such programs and applications may include an operating system, a file system, one or more databases, and a variety of applications, some of which may be artificial intelligence applications.

Volatile memory 322 may be used by processor 321 for code execution, scratch pad memory, temporary storage of video data, and the like. Non-volatile memory 323 may be used by processor 321 to store the programs, data, and various digital camera clients 330. It may also be used as mass storage for the video data captured by optics module 310. Optional vector processor 324 may be used for high-speed parallel calculations. In some embodiments, vector processor 324 may be implemented as part of the artificial intelligence logic 340. Vector processor 324 may be a graphics processing unit (GPU) and/or have a single instruction/multiple data (SIMD) processor architecture and be capable of operating on very long data words like, for example, 128-bits, 256-bits, 512-bits, 1024-bits, or even more in some embodiments. Computer-readable storage medium 325 may be used by processor 321 for program storage, data, and other purposes.

Artificial intelligence logic 340 may be either a hardware function, a software function, or a combination thereof. It may be responsible for managing all artificial intelligence (AI) functions, controlling the artificial neural networks 350-1, 350-2 through 350-N and using them for various functions, image processing functions, updating the AI modeling, and the like. Artificial neural networks 350-1, 350-2 through 350-N may be neural networks of the sort described in conjunction with FIG. 2 above and may be implemented in both hardware and/or software and/or a combination of hardware and software.

Figure 4:
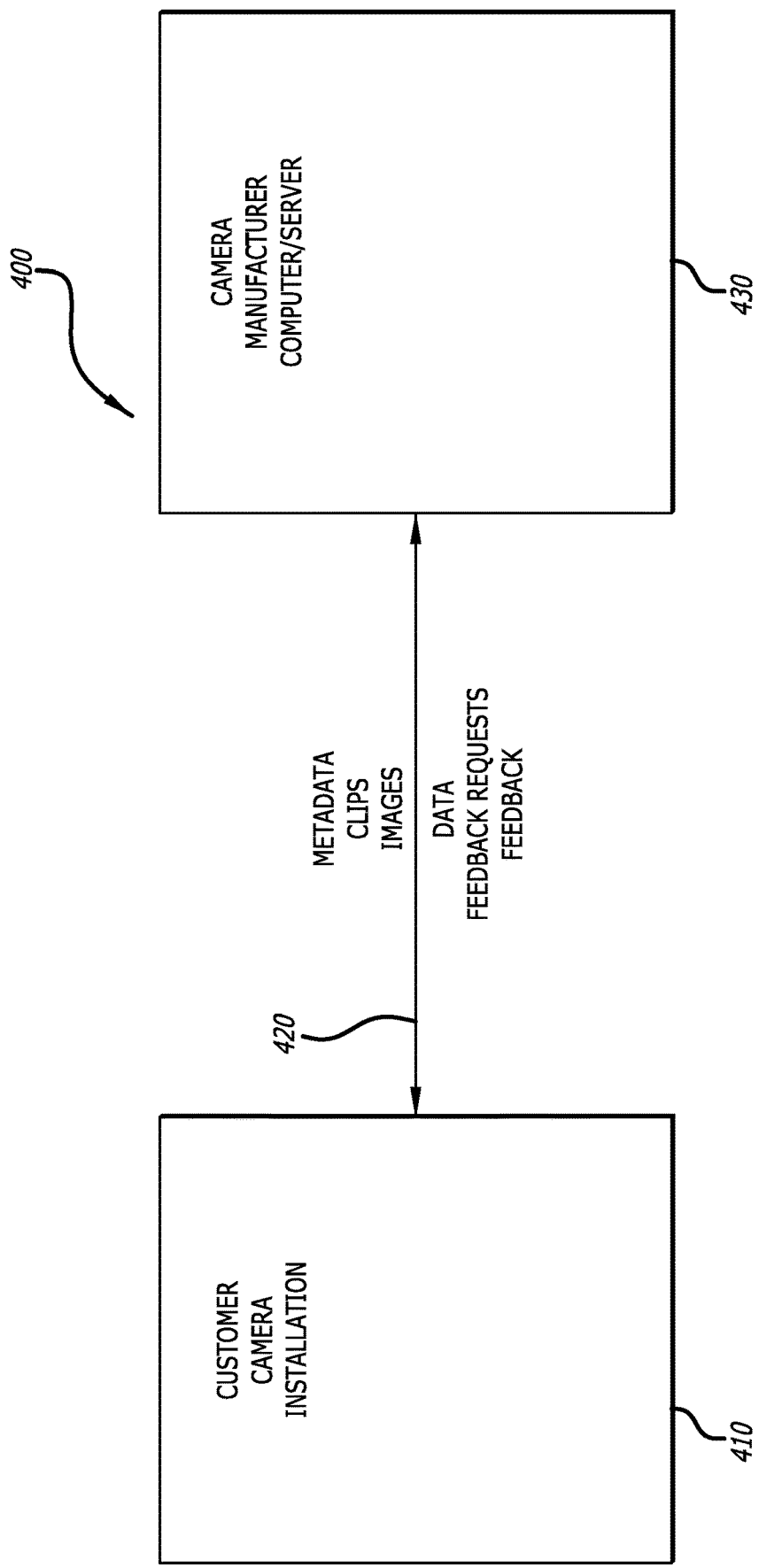
FIG. 4 is a schematic block diagram of a video processing and storage system in accordance with an embodiment of the disclosure.

Referring to FIG. 4, a schematic block diagram of a video processing and storage system 400 in accordance with an embodiment of the disclosure is shown. A customer camera installation 410 may comprise all of a customer's cameras. They may be coupled directly to a network 420 such as the Internet, or the cameras may be indirectly coupled to network 420 through a computer, a gateway, a server, or the like (not shown).

In some embodiments, the manufacturer of the cameras may also have one or more computers or servers 430 coupled to network 420. This is typically to enhance the customer's user experience with the camera installation by performing various tasks in the background with the customer's permission. Such tasks may include, for example, monitoring the functionality of the various cameras and creating service alerts or performing remote repairs, automatic updates to the camera software or firmware, assisting the customer with various aspects of managing their installed system, etc. In other embodiments, computers/servers 430 could represent the servers/computers of a service provider who receives data from the cameras and provides various services on the data including analytics and processing. In some instances, the service provider may not be the manufacturer of the cameras.

In particular, the cameras may be deployed with a particular AI model in the software and/or firmware and/or hardware configured, for example, to identify objects (cars, people, packages, etc.), track their motion, identify characteristics of the object (gender, size, color, etc., depending on the identified object), and the like. The model may be trained at the factory, deployed with the camera, and updated periodically during the lifetime of the camera. The model may consist of the coefficients and the architecture for an artificial neural network like, for example, the one illustrated in FIG. 2. The architecture refers to the ground design choices such as the numbers of layers, the width of each layer, type of layers (Fully Connected, Convolutional, etc.), type of activation functions, etc. These may be determined by running a training data set of annotated examples through a neural network that has been correctly annotated. The neural network may compare the known correct result to the model output and "learns" by adjusting the coefficients to improve the accuracy of its outputs, in a process commonly known as "machine learning."

Over time, the quality of the model outputs may degrade. This may occur for a variety of reasons including, but not limited to, changes in traffic patterns, changes in the visual fields of the cameras, changes in time of day, changes in the day of the week, changes of the seasons, etc. These crate image conditions that are not accounted for in the training dataset. This can refer to image capture (unseen light or weather condition), image context (significant background elements have changed due to human intervention or landscape change due to changes of seasons) or image content (object occlusion or size, object relation not captured in the training dataset, [i.e., hat detector only trained on images with human wearing a hat cannot recognize a standalone hat]), etc. To keep the accuracy of the model's outputs high, periodic retraining may be needed. It may be desirable to include new annotated examples from a wide distribution of cameras surveilling a large variety of visual fields and target objects and/or characteristics to the training data set. This may be done by utilizing real annotated examples from the video logs of the cameras deployed in the field. However, this may involve thousands of cameras in dozens or even hundreds of installations with each camera storing hundreds of hours of video. Since human annotation may be needed for the annotated examples in the annotated training set, it may be difficult and/or impossible for humans to manually review all of that data looking for appropriate annotated examples to annotate. The process may be simplified by limiting the annotated examples to cases that the model has had difficulties in making correct identifications. This may reduce the number of potential candidates for new annotated examples.

Figure 5:
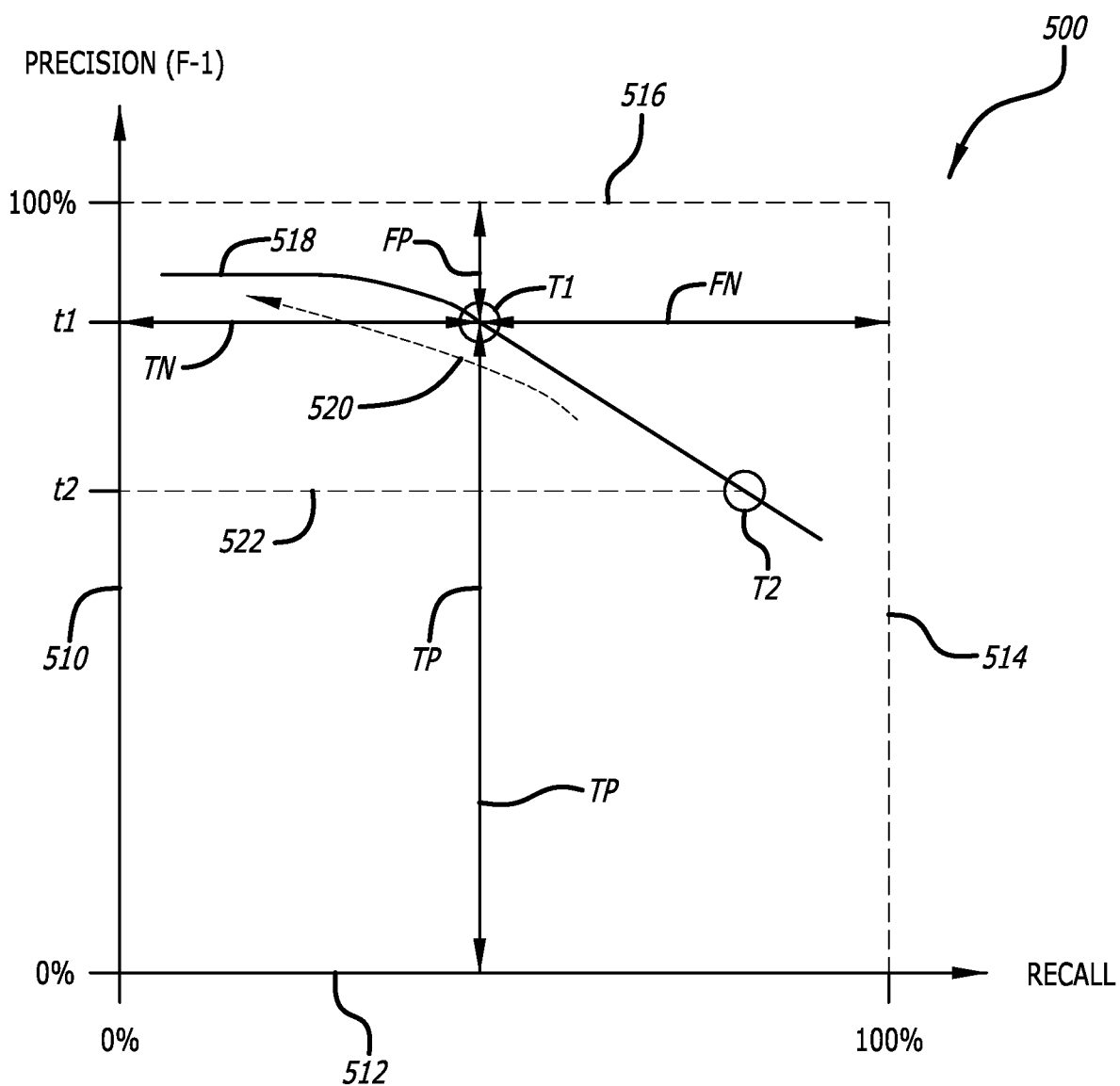
FIG. 5 is a graph of a Precision and Recall (PR) curve in accordance with an embodiment of the disclosure.

Referring to FIG. 5, a graph of a Precision/Recall (PR) curve in accordance with an embodiment of the disclosure is shown. The graph 500 comprises a vertical Precision-axis 510 and a horizontal Recall-axis 512. Both axes range from 0% to 100%. The dashed lines 514 and 516 along with the axes 510 and 512 form an extent box for the PR curve 518. In general, Precision may be a measure of the accuracy of a model's predictions while Recall may be a measure of its sensitivity. A measure of model accuracy called the F-1 score is defined as the harmonic mean of the Precision and Recall scores for any point on the PR curve 518. The model may return a confidence score for any particular prediction of an image or object. There may be a relationship between the confidence threshold set by the manufacturer and the precision, in that the higher the threshold, the higher the precision obtained by the model as indicated by the curved dashed arrow 520.

Also shown in FIG. 5 is confidence threshold point T1 (at the center of the labeled circle) on the PR curve 518. This value may be chosen by the camera manufacturer. The solid arrow TP represents the percentage of true positives (e.g., identification of a present object) for the model, while the solid arrow FP represents the percentage of false positives (e.g., identification of an object where no object is present). Similarly, the solid arrow TN represents the percentage of true negatives (e.g., identification of the absence of an object where no object is present) for the model, while the solid arrow FN represents the percentage of false negatives (e.g., identification of the absence of an object where an object is present). As the PR curve 518 moves to the left, the number of FPs decreases while the number of false negatives FN increases. Thus, there may be a tradeoff to be made in choosing the right location for T1.

An object detection model may output such values as class (person, animal, car, etc.), bounding box (the location and extents of the object in a frame), and a confidence score (typically a percentage or decimal equivalent). The point T1 may correspond to the Precision and Recall for a certain confidence threshold set by the manufacturer. T1 may correspond to the minimum acceptable value of T1 after initial training or retraining of the model. Over time, the confidence level in the outputs of the AI model may degrade due to changes in the visual field of the camera or changes in the camera owner's desired use of the camera or the like. The confidence threshold point T2 (at the center of the labeled circle) may correspond to the Precision and Recall values where remedial action may be taken.

Figure 6:
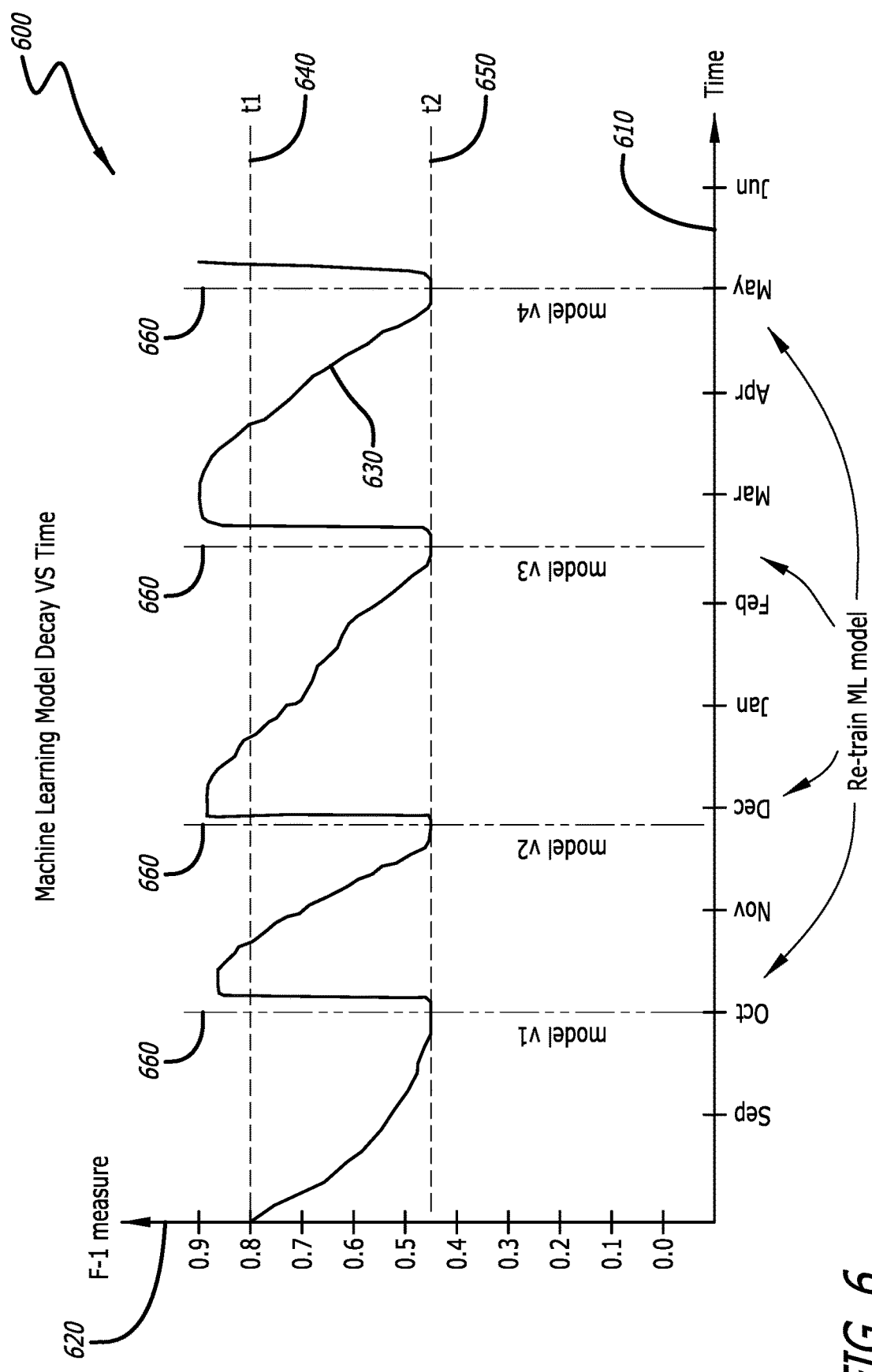
FIG. 6 is a graph of machine learning model decay in accordance with an embodiment of the disclosure.

Referring to FIG. 6, a graph of machine learning model decay 600 in accordance with an embodiment of the disclosure is shown. In the picture, the horizontal time axis 610 and the F-1 measure axis 620 are shown. The F-1 measure is the harmonic mean of the Precision and Recall. The scale is from 0.0 (0%) to 1.0 (100%). Data curve 630 may show the value of F-1, while dashed line 640 may show the chosen value of T1, and dashed line 650 may show the chosen value of T2. Over time, the value of the F-1 curve 630 may vary where the confidence model may decay until it reaches the T2 level. This may be followed by a retraining period to generate an updated model where the value of the F-1 curve 630 may be increased to at least the value of T1. The new model may be deployed to the camera or cameras at the various times indicated by dashed lines 660. Persons skilled in the art will realize that the exact values of T1 and T2 shown are a matter of design choice and may vary substantially from model to model or version to version. Similarly, such skilled persons will realize that the time scale on axis 610 may also vary and the time between retraining cycles may also vary substantially.

Figure 7A:
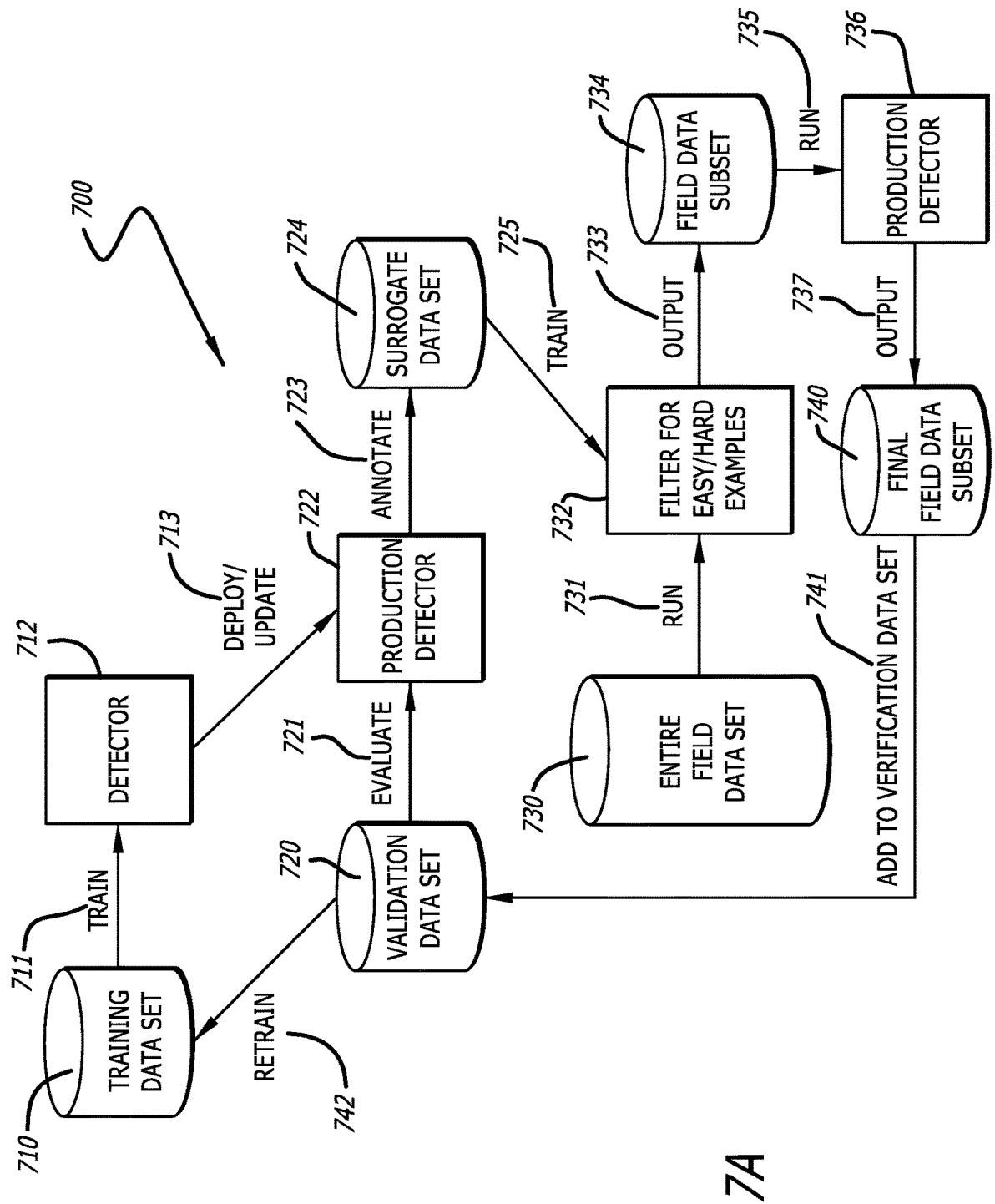
FIG. 7A is a conceptual diagram of a video processing and storage system in accordance with an embodiment of the disclosure.

Referring to FIG. 7A, a conceptual diagram of a video processing and storage system in accordance with an embodiment of the disclosure is shown. In computational system 700, a training data set 710 may be used to train (arrow 711) a detector model 712 which may use a conventional machine learning process to generate an AI model. In some embodiments this may be done on the camera manufacturer's computers or servers with the same model being distributed to all cameras, while in other embodiments it may be done in the camera itself and may be unique to that camera. In the first iteration of training (arrow 711) detector model 712, the training data set 710 may have no field data present. The initial training data set 710 may have synthetic data obtained from one or more sources like, for example, data developed internally by the camera manufacturer, data purchased from a third party, open-source data, some combination thereof, etc. After initial deployment (arrow 713), system 700 will add additional field data to training data set 710 as described below. Once the detector model 712 is deployed (arrow 713) to the cameras via the Internet or by other means, it becomes the current production detector 722.

The confidence factor F-1 decay over time means that production detector 722 may be monitored and its outputs may be evaluated periodically. A validation data set 720 may be used to monitor and evaluate (arrow 721) production detector 722. Initially, like training data set 710, there is no field data in validation data set 720 initially. Eventually, system 700 will add additional field data to validation data set 720 as described below. The output of production detector 722 will be annotated (arrow 723) to create surrogate data set 724. Surrogate data set may have the same frames as in validation data set 720 but with different labels from the annotation process (arrow 723). In certain embodiments, the annotation process (arrow 723) may be done manually. This may involve a human visually looking at individual frames and correctly labeling true and false positives and true and false negatives. In alternative embodiments, the labeling may be done by a computationally intensive AI run external to the camera, like, for example, in servers operated by the camera manufacturer or by another service provider, out on the web, in the cloud, etc. There is no theoretical reason why the annotation (arrow 723) using an AI cannot be done internal to the camera if sufficient computing and memory resources are available.

The surrogate data set 724 with the new labels may be used to train (arrow 725) a filter 732. The annotations in surrogate data set 724 may customize the filter 732 to specifically separate easy from hard examples. When the training (arrow 725) is complete, the entire field data set 730 may be run (arrow 731) through filter 732, whose output (arrow 733) may, in turn, be used to generate field data subset 734. The entire field data set 730 may be the entire video data archived in all instances of the camera in service. Each camera may run (arrow 731) its own local video archive through its copy of filter 732 and its output (arrow 733) may be used produce its own portion of field data subset 734. This may produce a substantially reduced field data subset 734 relative to entire field data set 730.

Field data subset 734 may be run (arrow 735) through production detector 736 (which may be the same model as production detector 722). The output (arrow 737) of production detector 736 may be used to generate final field data subset 740, which may comprise high-quality training examples. These examples may be added (arrow 741) to the validation data set 720. This may allow more effective evaluation (arrow 721) of the quality of production detector 722.

If the confidence factor F-1 reaches the T2 level, retraining (arrow 742) may be needed. The retraining (arrow 742) may use field generated data from the validation data set 720 to update training data set 710. After the update, training data set 710 may be used to train (arrow 711) in a conventional manner. When the training is complete, the new detector model 712 is used to update (arrow 713) production detector 722. In some embodiments, production detector 722 may be deployed (arrow 713) to all of the cameras in the field, while in certain embodiments only a subset of the deployed cameras may be updated.

Figure 7B:
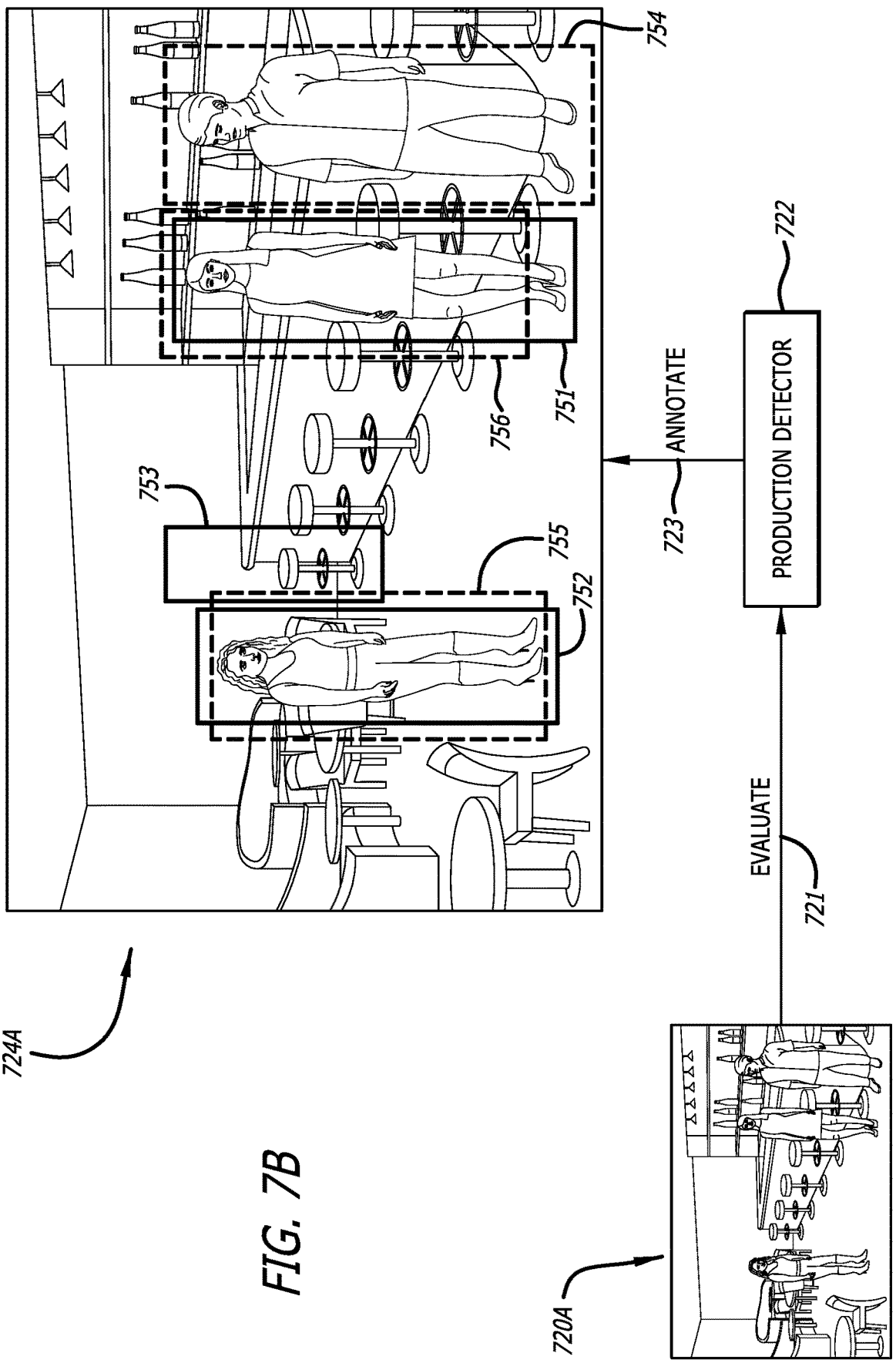
FIG. 7B is a conceptual diagram of annotating a frame for a surrogate data set in accordance with an embodiment of the disclosure.

Referring to FIG. 7B, a conceptual diagram of annotating a frame for a surrogate data set in accordance with an embodiment of the disclosure is shown. Exemplary frame 720A may be a frame taken from the validation data set 720. It is evaluated (arrow 721) by production detector 722. The outputs of production detector 722 are then annotated (arrow 723) and sent to surrogate data subset 724. Exemplary annotated frame 724A is taken from field data subset 724. The background image is the same in frames 720A and 724A. The differences lie in the annotations.

The rectangles in exemplary annotated frame 724A are bounding boxes 751 to 756—rectangular areas denoting the furthest horizontal and vertical extents of an object. Bounding boxes 751, 752, and 753 correspond to model predictions from production detector 722 that an object is present in exemplary annotated frame 724A in each of those locations. Bounding boxes 754, 755, and 756 correspond to annotations (arrow 723) indicating locations where an object is actually present (sometimes called the "ground truth"). Bounding boxes 751 and 756 substantially overlap indicating that the model correctly predicted an object at that location. Similarly, bounding boxes 752 and 755 substantially overlap indicating that the model also correctly predicted an object at that location.

Bounding box 753 represents a false positive error—a location where the model predicts the presence of an object, but no object is present. Bounding box 754 represents a false negative error—a location where the model failed to predict an object, but where an object is present. Exemplary annotated frame 724A is grouped with other annotated frames into surrogate data set 724. Surrogate data set 724 is then used to train (arrow 725) filter 732 to look for hard cases to include in field data subset 734.

Figure 8:
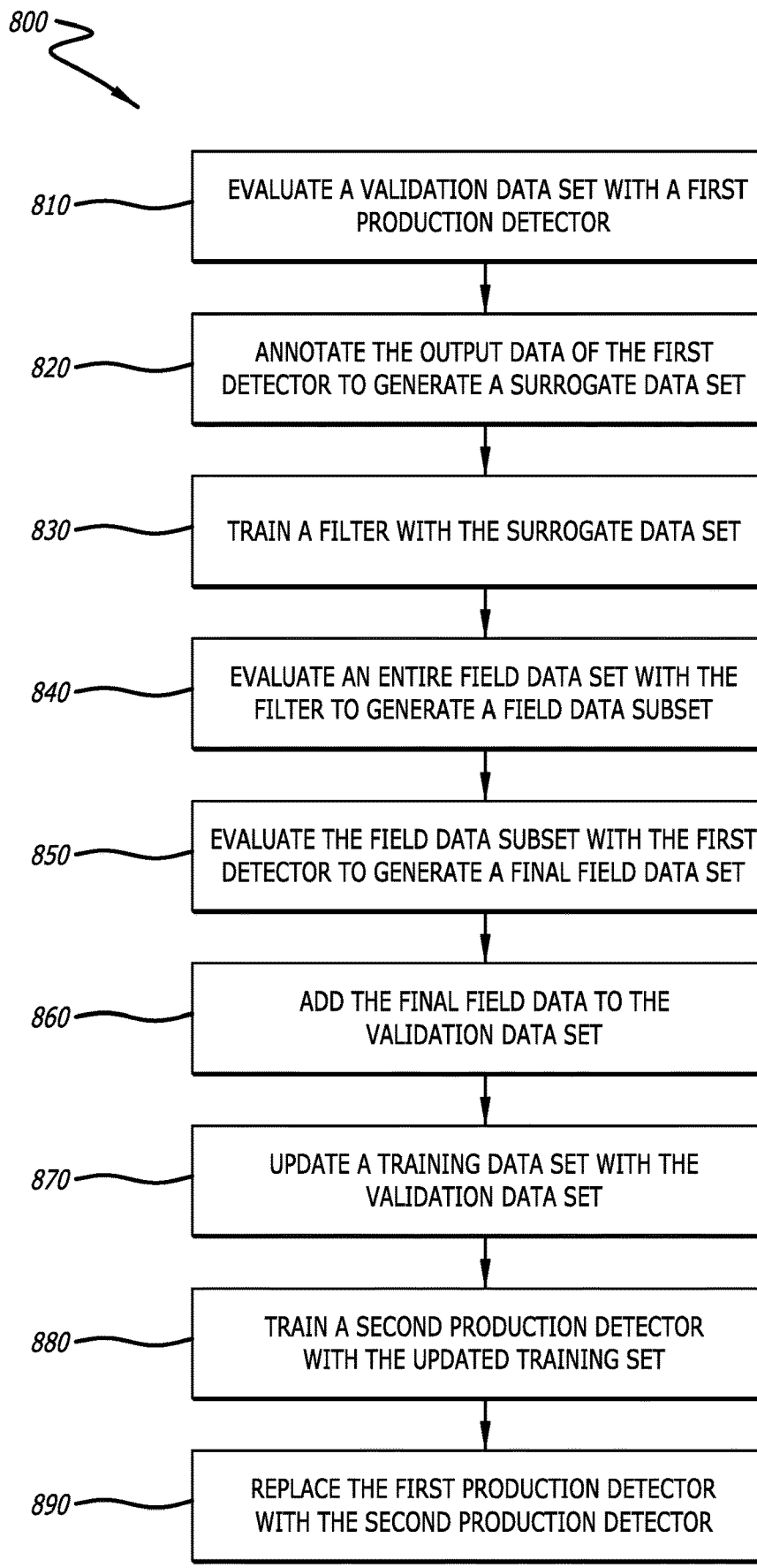
FIG. 8 is a flowchart of a process for collecting data and retraining a model in accordance with an embodiment of the disclosure.

Referring to FIG. 8, a flowchart of a process 800 for collecting data and retraining a model in accordance with an embodiment of the disclosure is shown. Process 800 may begin by evaluating a validation data set using the current version of a production detector (block 810). The validation data set may be continuously updated from cameras deployed with customer's installations. The production detector may be continuously monitored to assess changes in the confidence score F-1 due to drift over time.

The output of the production detector may be annotated to generate a surrogate data set (block 820). The annotation process may be done either manually or automatically. The surrogate data set may contain frames from the validation data set, but the labeling for each frame may be changed by the annotation process to reflect the correctness of the predictions. In particular, false positives and false negatives may be selected for in the generation of the surrogate data set.

The surrogate data set may be used to train a filter (block 830). The makeup of the surrogate data set may allow the filter to identify cases prone to error by the current version of the production detector. In some embodiments, these hard cases may occur when the confidence score is close to the cutoff point between true positives and false positives, while in alternate embodiments these hard cases may occur close to the cutoff point between true negatives and false negatives.

An entire field data set may be run through the filter to generate a field data subset (block 840). Ideally, this should occur in each individual camera which may run its own locally stored field data set through the filter to generate the local portion of the field data subset. By performing this locally to the camera, very little data may need to be sent from the camera to the manufacturer's or service provider's computers or servers at any point of the process because the largest portion of the data used is the field data set which remains in the camera. The field data subset may be substantially smaller than the entire field data set.

The field data subset may be run through the current version of the production detector to generate a final field data set (block 850). Ideally, this should occur in each individual camera which may run its own locally stored field data subset through the production detector to generate a locally stored portion of the final field data set. The final field data set may be collected from all the deployed cameras and may comprise high quality cases for addition to the validation data set (block 860).

If the confidence score F-1 of the current version has dropped below a minimum threshold value, retraining may be necessary. In such a case, the validation data set may be used to update the training data set (block 870). The updated training data set may be used to conventionally train a new detector model (block 880). The new detector model may be deployed to some or all of the installed camera base to become the new production detector (block 890).

Information as herein shown and described in detail is fully capable of attaining the presently described embodiments of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   an artificial intelligence logic configured to:
      evaluate a validation data set with a first production detector;
      use annotation of an output of the first production detector to generate a surrogate data set;
      train a filter with the surrogate data set;
      evaluate an entire field data set with the filter to generate a field data subset;
      evaluate the field data subset with the first production detector to generate a final field data subset;
      add the final field data subset to the validation data set, updated a training data set with the validation data set;
      train the second production detector with the updated training set; and
      replace the first production detector with the second production detector, wherein the field data subset is run through a second production detector to generate a locally stored portion of the final field data set.

2. The device of claim 1, wherein the annotation of the output of the first production detector is, at least in part, performed manually.

3. The device of claim 1, wherein the annotation of the output of the first production detector is performed computationally.

4. The device of claim 1, wherein the device further comprises an optics module and the field data set comprises video data obtained via the optics module.

5. The device of claim 1, wherein the field data set comprises surveillance video.

6. A system, comprising:
   a computational system configured to:
      evaluate a validation data set with a first production detector;
      use annotation of an output data of the first production detector to generate a surrogate data set; and
      train a filter with the surrogate data set; and
   a device, comprising:
      an artificial intelligence logic configured to:
      receive the trained filter;
      evaluate an entire field data set with the filter to generate a field data subset;
      evaluate the field data subset with the first production detector to generate a final field data subset;
      add the final field data subset to the validation data set;
      update a training data set with the validation data set;
      train the second production detector with the updated training set; and
      replace the first production detector with the second production detector, wherein the field data subset is run through a second production detector to generate a locally stored portion of the final field data set.

7. The system of claim 6, wherein the annotation of the output of the first production detector is, at least in part, performed manually.

8. The system of claim 6, wherein the annotation of the output of the first production detector is performed computationally.

9. The system of claim 6, wherein the device further comprises an optics module and the entire field data set comprises video data obtained via the optics module.

10. The system of claim 6, wherein the entire field data set comprises surveillance video.

11. A method, comprising:
evaluating a validation data set with a first production detector;
annotating output data of the first production detector to generate a surrogate data set;
training a filter with the surrogate data set;
evaluating an entire field data set with the filter to generate a field data subset, wherein a portion of the entire field data set comprises surveillance video;
evaluating the field data subset with the first production detector to generate a final field data set;
adding the final field data to the validation data set;
updating a training data set with the validation data set;
training the second production detector with the updated training set; and
replacing the first production detector with the second production detector, wherein the field data subset is run through a second production detector to generate a locally stored portion of the final field data set.

* * * * *

UNITED STATES PATENT AND TRADEMARK OFFICE
CERTIFICATE OF CORRECTION

| | | |
|---|---|---|
| PATENT NO. | : 12,111,886 B2 | |
| APPLICATION NO. | : 17/515977 | |
| DATED | : October 8, 2024 | |
| INVENTOR(S) | : Damien Kah et al. | |

It is certified that error appears in the above-identified patent and that said Letters Patent is hereby corrected as shown below:

In the Claims

In Column 14, Line 14, please replace "updated" with --update--

In Column 14, Line 20, please replace "final field data set" with --final field data subset--

In Column 14, Line 53, please replace "final field data set" with --final field data subset--

In Column 15, Line 11, please replace "final field data" with --final field data subset--

In Column 15, Line 19, please replace "final field data set" with --final field data subset--

Signed and Sealed this
Twelfth Day of November, 2024

Katherine Kelly Vidal
*Director of the United States Patent and Trademark Office*